(12) United States Patent
Goldberg et al.

(10) Patent No.: US 6,434,543 B1
(45) Date of Patent: Aug. 13, 2002

(54) SYSTEM AND METHOD FOR RELIABLE CACHING OF DATABASE CONNECTIONS IN A DISTRIBUTED APPLICATION

(75) Inventors: Robert N. Goldberg, Redwood City; Seth J. White, San Jose, both of CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/430,874

(22) Filed: Nov. 1, 1999

(51) Int. Cl.[7] .............................................. G06F 17/30
(52) U.S. Cl. ............................ 707/2; 707/6; 707/103 R
(58) Field of Search ................................. 707/1, 2–4, 10, 707/200

(56) References Cited

U.S. PATENT DOCUMENTS

| | | | | |
|---|---|---|---|---|
| 5,596,745 A | * | 1/1997 | Lai et al. ................. 707/103 R |
| 5,608,900 A | * | 3/1997 | Dockter et al. ............. 707/102 |
| 5,857,201 A | * | 1/1999 | Wright, Jr. et al. ......... 707/104 |
| 5,884,297 A | * | 3/1999 | Noven ........................... 707/1 |
| 5,899,990 A | * | 5/1999 | Maritzen et al. ................ 707/4 |
| 5,974,417 A | * | 10/1999 | Bracho et al. ................ 707/10 |
| 6,092,063 A | * | 7/2000 | Cheng et al. ................... 707/2 |
| 6,112,196 A | * | 8/2000 | Zimowski et al. ............. 707/2 |
| 6,216,151 B1 | * | 4/2001 | Antoun ........................ 709/203 |
| 6,226,684 B1 | * | 5/2001 | Sung et al. .................. 709/238 |

* cited by examiner

*Primary Examiner*—John Breene
*Assistant Examiner*—Debbie Le
(74) *Attorney, Agent, or Firm*—Kudirka & Jobse, LLP (57) ABSTRACT

Connection information for open database connections is stored or "cached" in a connection manager at the database client. Therefore, even when a query is complete and the connection between the client and server is released, the manager maintains the database connection open. When a new query arrives at the client, the connection manager compares the connection information in the query to the corresponding information stored for each open connection. If there is a match and the connection is not in use, the already open connection is used for the new query. If there is no match, a new connection is opened until a predetermined limit of the number of connections is reached. When the limit is reached, an open connection which is not in use is closed and a new connection is established. In accordance with a preferred embodiment, a "free" list of open connections which are not in use is maintained so that a quick comparison can be made with the incoming query information.

24 Claims, 11 Drawing Sheets

SYSTEM AND METHOD FOR RELIABLE CACHING OF DATABASE CONNECTIONS IN A DISTRIBUTED APPLICATION

FIELD OF THE INVENTION

This invention relates to distributed object systems and, more particularly, to a system and method for managing connections between a client object and a database object in order to efficiently utilize the database.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features. As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and re-used in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client object. In this manner, the objects can be developed and maintained by a party different from the party that developed the client application.

In order to standardize the data transfer process, several interfaces and protocols have been developed which allow objects in one program to interact with objects in another program which may be written in a different language and residing on a different platform. For example, one such specification was developed by an industry consortium called the Object Management Group (OMG) whose mission was to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications and provides various standard object services, such as naming, life cycle, notification and persistence services. The ORB functions as a communication infrastructure, transparently relaying object requests across distributed heterogeneous computing environments. Inter-operability is accomplished through well-defined object interface specifications which allow client applications to connect to the ORB. CORBA also provides an implementation independent notation for defining interfaces called the OMG Interface Definition Language (IDL). Other distributed object protocols include Java RMI.

A distributed object system can also incorporate a data source, such as a database. The database is associated with a database server. A client object interacts with the database server in a conventional manner. The client object may also be viewed as a server from other client objects, as will be recognized by those skilled in the art. In order to use the database, the client object must first connect to the database and the connection then forwards database queries to the database and returns the result set. For example, in a distributed system which is compliant with the Java Database Connectivity API (JDBC), a client connects to the database by instantiating a connection object. The connection object then internally manages all aspects of the connection so that the details are transparent to the client. Effectively, the connection object acts as a pipeline to the underlying DBMS driver.

Although connection objects make interaction with a database straightforward, they do not manage resources well. For example, the client object may make repeated queries to a particular database and, consequently, it may be desirable to leave a database connection open even after a query has been completed. Since, most databases have a maximum number of simultaneous connections that can be handled, leaving connections open may cause the server to quickly exhaust the number of possible connections. Alternatively, if connections are closed after a query is complete, performance suffers since there is significant overhead involved in establishing a new connection to the same database if the same client should issue another query.

SUMMARY OF THE INVENTION

The foregoing problem is solved in one embodiment of the invention in which open connections are stored or "cached" in a connection manager at the client. Therefore, even when a query is complete and the connection between the client and server is released, the manager maintains the database connection open.

In accordance with one embodiment, connection information which can include the database name, user name and login password are stored in the connection manger for each open connection. When a new query arrives at the server, the connection manager compares the connection information in the query to the corresponding information stored for each open connection. If there is a match and the connection is not in use, the already open connection is used for the new query. If there is no match, a new connection is opened until a predetermined limit of the number of connections is reached. When the limit is reached, an open connection which is not in use is closed and a new connection is established.

Even though a query is completed, the connection manager does not close the connection until a new connection is needed and the connection number limit has been reached. Therefore, connections can be "shared" and the overhead involved in establishing new connections is significantly reduced.

In accordance with another embodiment, a "free" list of open connections which are not in use is maintained so that a quick comparison can be made with the incoming query information.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
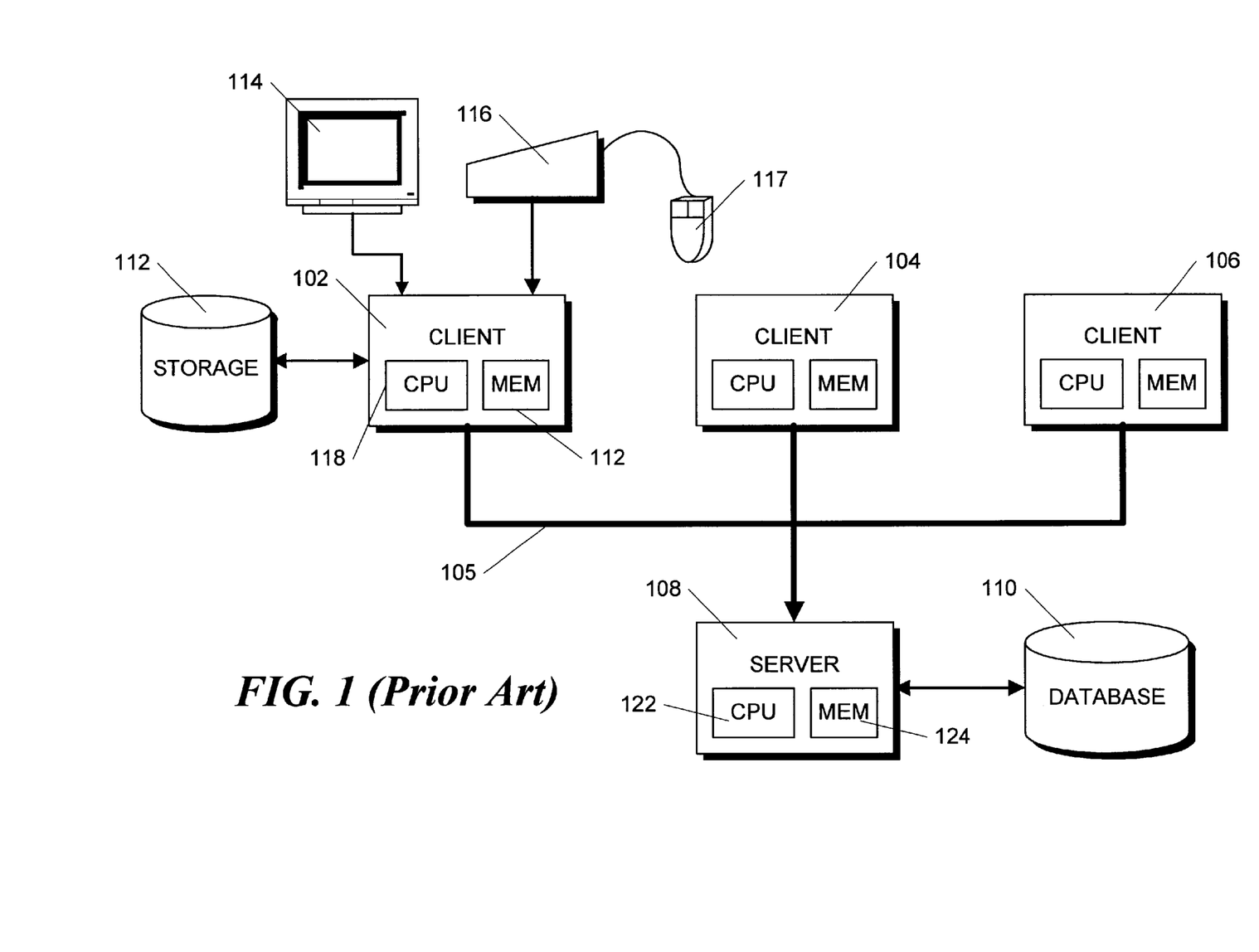
FIG. 1 is a schematic diagram of a prior art computer network system on which a distributed object system can be built.

FIG. 1 is a block diagram of a system 100 on which an illustrative connection manager constructed according to the present invention can run. As shown, the system 100 is a distributed computing environment comprising a plurality of individual computer nodes 102, 104, 106 and 108. The nodes are functionally organized into clients 102, 104 and 106 and at least one server 108 interconnected over a network 105. However, the clients 102, 104 and 106 and server 108 can also be implemented on a single node. Each node, whether a client 102, 104, 106 or server 108, is a conventionally programmed digital computer, respectively including a central processing unit (CPU) 118, 122, and a main memory 112, 124 interconnected with the CPU 118, 122. In addition, each client 102–106 and server 108 can include user interfacing devices, such as a monitor 114, keyboard 116 and mouse 117 and a storage device 112 (shown in FIG. 1, by way of example, for just one client 102). The server 108 includes a database 110, such as a relational database, file system or other organized data storage system. The individual components implementing each node 102–108 are interconnected over a central system bus (not shown) used for exchanging address, data and control signals, although other forms of component interconnections are possible. Finally, the system 100 can include devices for accepting computer-readable storage mediums (not shown) and can be interconnected with the network 105 for exchanging data and control signals transmitted as a computer data signal in a carrier wave.

In the described embodiment, each node 102–108 is a network connectable computer, such as a Sun SparcStation™ 5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash.

Distributed computing environments can be logically viewed as a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, itself use other software objects. Thus, an application in a distributed computing environment can consist of the combination of application-specific objects and the combined local and remote objects it uses. When one object calls an operation on another object, the calling object is referred to as the "client" while the called object is referred to as the "server."

Figure 2:
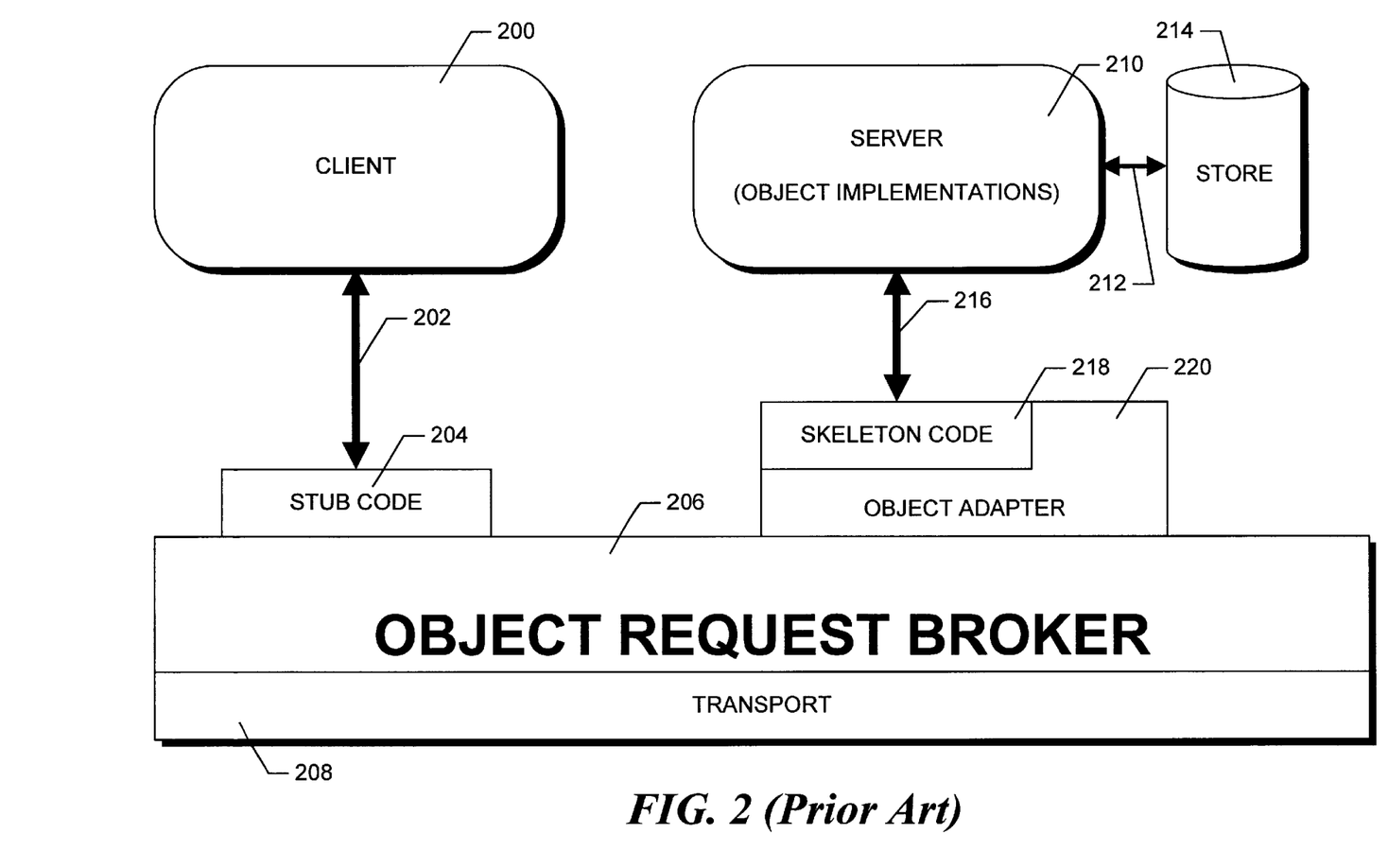
FIG. 2 is a block schematic diagram illustrating a prior art CORBA environment and showing the relationship of the client, ORB, object adapter, server and database.

FIG. 2 illustrates, in a very schematic form, the basic CORBA architecture which defines a peer-to-peer distributed computing facility where all applications are objects (in the sense of object orientation). Objects can alternate between client roles 200 and server roles 210. An object operates in a client role 200 when it is the originator of an object invocation. An object operates in a server role 210, called an object implementation, when it is the recipient of an object invocation.

The client 200 communicates with the server 210 by means of an object request broker or ORB 206. The ORB 206 operates with a transport 208 that conveys information between the client 200 and server 210 and, as previously mentioned, the ORB 206 handles the marshaling, transport and unmarshaling of information between client 200 and server 210. The client 200 communicates with the ORB 206, as indicated schematically by arrow 202, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 210 export object references with interfaces specified by the OMG IDL for use by clients. The object reference contains an identification of the object implementation so that the server 210 can pass a request to the correct object. The server 210 communicates with a data store, as indicated by an arrow 212, to store and retrieve data, including persistent object data.

The entire CORBA architecture is actually implemented in a conventional programming language, such as C, C++, or Smalltalk. Implementations in a variety of languages are available from a number of vendors who typically provide a compiler bundled with their ORB products. The compilers generate header files which define the OMG IDL interfaces and can be incorporated into application programs. The compilers also generate stub code 204 and skeleton code 218 for each interface.

The client application program 200 can link directly to the OMG IDL stub code 204. As far as the client application program is concerned, an invocation of the stub code 204 appears to be a local function call. Once invoked, the stub code 204 provides an interface to the ORB 206 that performs marshaling to encode and decode the operation's parameters into communication formats suitable for transmission on the transport 208 to the server 210.

At the server side, the OMG IDL skeleton code 218 is the corresponding implementation of the OMG IDL interface. When the ORB 206 receives a request, the skeleton code 218 unmarshals the request parameters and generates a call, indicated schematically by arrow 216, to an object implementation in the server 210. When the server completes processing of the request, the skeleton code 218 and stub code 204 return the results to the client program 200. If an error has occurred, exception information generated by the server or by the ORB is returned.

An object adapter 220 comprises the interface between the ORB 206, the skeleton code 218 and the server 210. Object adapters, such as adapter 220, support functions, such as registration of object implementations and activation of servers. There are many potential types of object adapters, depending on the purpose of the adapter. The original CORBA specification defined only a general-purpose Basic Object Adapter or BOA. The BOA performs some basic functions. For example, when a client request specifies an inactive server process, the BOA automatically activates the server process. When the server is activated it registers its implementation with the BOA. The BOA then stores this registration to use in future object requests. After an object is activated, it can receive client requests by means of a callback method in the skeleton code 218. BOA services also include exception handling and object reference management.

Figure 3:
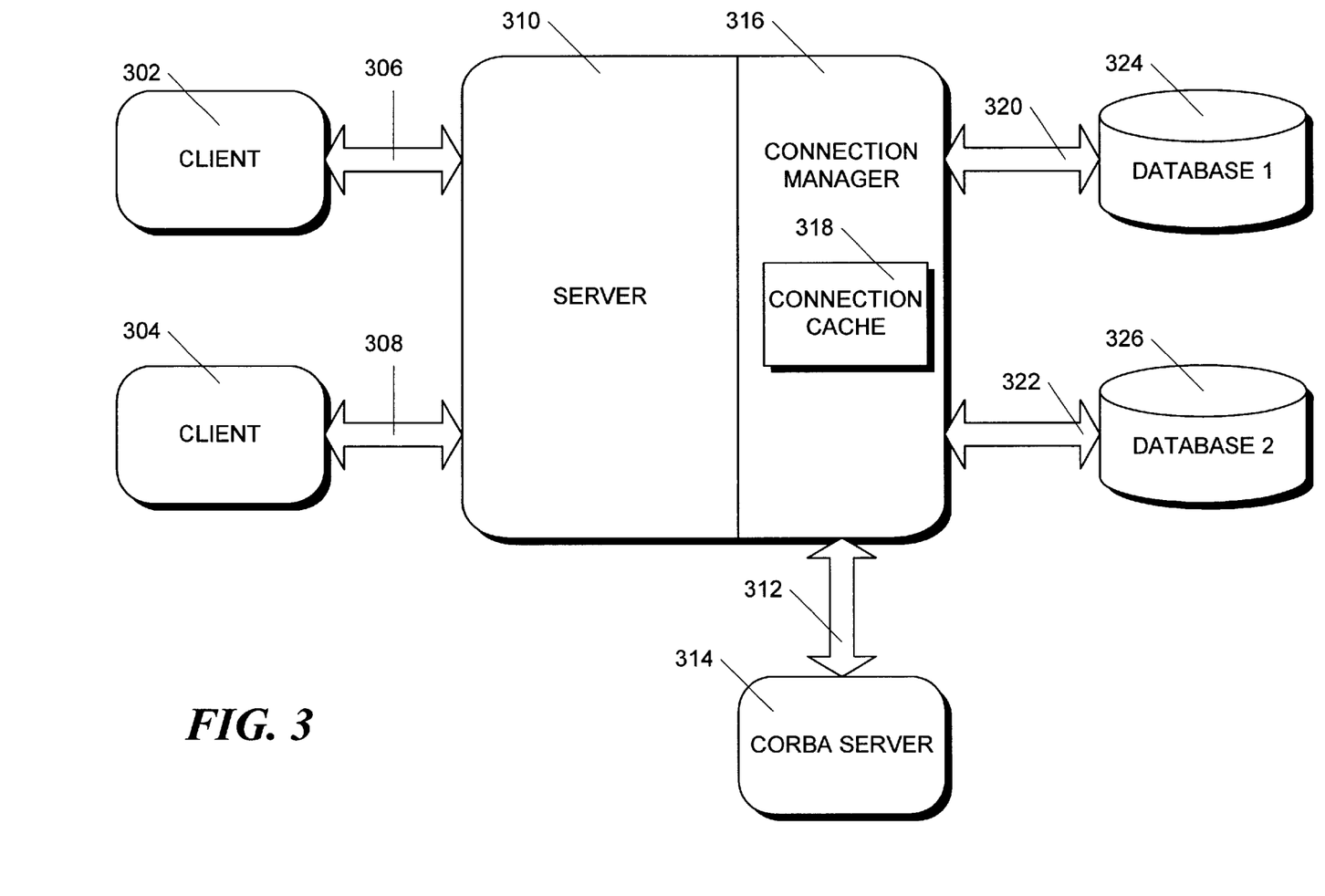
FIG. 3 is a block schematic diagram illustrating the operation of the inventive connection manager.

FIG. 3 is a schematic block diagram which illustrates the operation of the inventive connection manager in managing connections to databases in a distributed object system. As shown in FIG. 3, client objects 302 and 304 interact with a server object 310 to access databases 324 and 326. The interaction of client objects 302 and 304 with server object 310 is illustrated by arrows 306 and 308, respectively. These arrows schematically represent a distributed object transport system such as the aforementioned CORBA distributed object transport system.

In accordance with the principles of the present invention, rather than accessing databases 324 and 326 directly by, for example, instantiating connection objects, server object 310 utilizes the services of the inventive connection manager object 316 to establish the database connections. Other database servers, such as server 314, may also interact with connection manager 316 as indicated schematically by arrow 312.

Connection manager 316 manages the database connections 320 and 322 between the server 310 and databases 324 and 326, respectively. In particular, server 310 establishes a connection to one of databases 324 and 326 by requesting a connection handle from connection manager 316. Connection manager 316 maintains an internal cache 318 of connections that have been opened. When a connection is "free" or is no longer being used, connection manager 316 does not close the connection but instead stores identification information regarding the connection in the connection cache 318. For example, assume client 302 connects to server 310 via a connection 306 and causes server 310 to connect to database 324 over connection 320. When client 302 has finished with server 310, it drops the connection 306. However, connection manager 316 does not release connection 320, but instead stores the connection information including identification information for the client 302, the database 324 and any password information the client 302 uses to access the database 324 along with a handle to the connection in cache 318.

Subsequently, when client 302 re-establishes a connection 306 between itself and server 310 and, in response thereto, server 310 makes a request to again connect to database 324, connection manager 316 examines connection cache 318 to determine whether a database connection with the corresponding client, database and password information is stored therein. If it is, the associated connection handle is returned. If no existing connection is stored in the cache 318, then a new connection is opened and stored in the cache. Operation continues in this manner until the cache is full. If another connection handle is requested, connection manager 316 selects one of the unused open connections in connection cache 318 by means of a predetermined process and closes that connection in order to open the desired connection.

In this manner, database connections can be reused. For example, if server 314 always logs on under the same database name, user name and password, the same connection will be reused by connection manager 316 over and over. Thus, the overhead necessary to establish the connection is eliminated.

Figure 4:
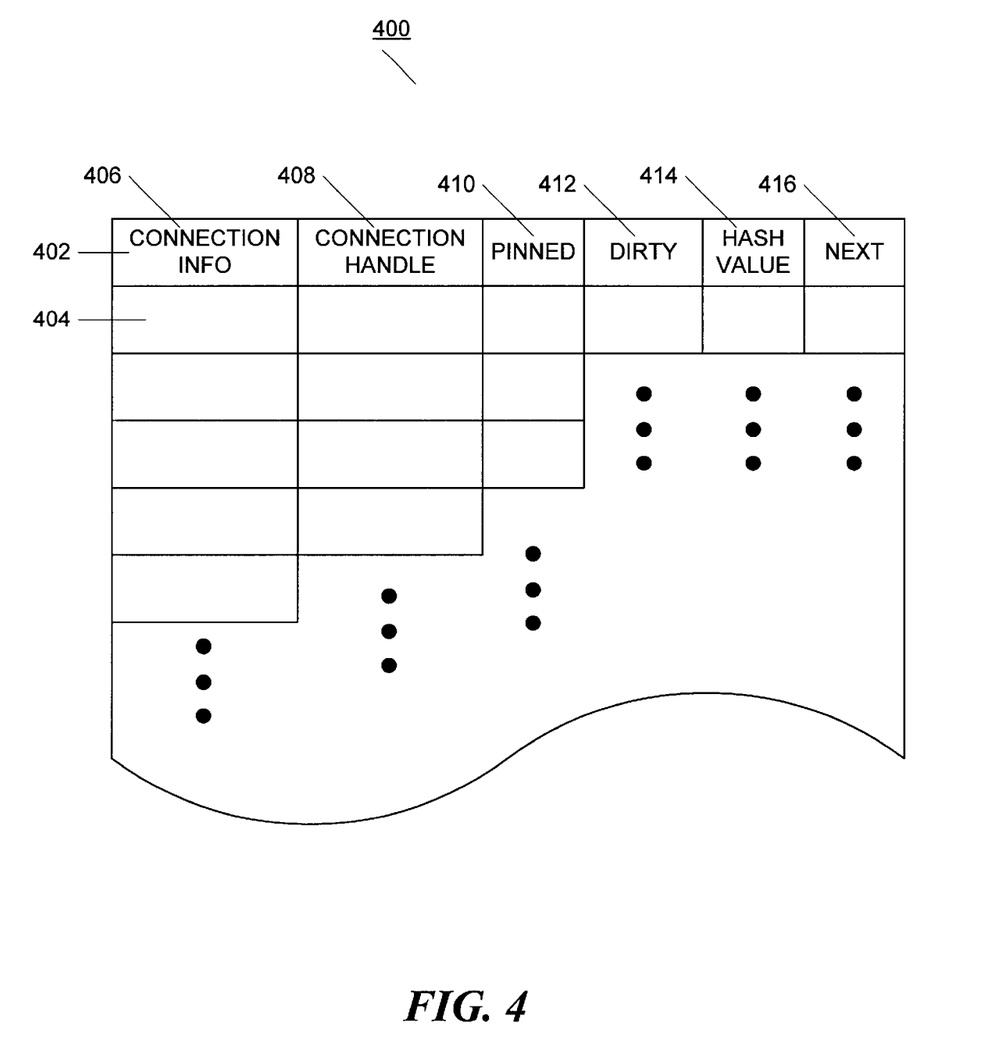
FIG. 4 is a partial diagram of a table configuration used to store connection information in accordance with one embodiment of the present invention.

In accordance with one illustrative embodiment, information regarding database connections which have been opened are stored in a cache table. In order to reduce lookup time of "free" or unused open connections, a separate free list is also kept. In accordance with the preferred embodiment, the free list is kept in a hash table which is accessed by hashing part of the connection information, such as the connection password. Hash collisions are handled by linking colliding entries together in a linked list. FIG. 4 illustrates the contents of one illustrative cache table. A table with the same structure may also be used for the free list hash table.

Table 400 comprises a predetermined plurality of entries which are represented as rows in the table. Each entry, 402, 404, etc. comprises six fields. The first field 406 holds information which identifies the connection. This information may, for example, consist of the user name, the database name, the user's password or any other information which is used to set up a particular database connection.

The next field 408 holds a handle which represents the connection. This may, for example, be a handle to the connection object in a JDBC system or other suitable mechanism for identifying the connection.

The next two fields 410 and 412 contain a "pinned" flag and a "dirty" flag. When set, the pinned flag 410 indicates that the connection represented by the entry is currently in use and, therefore, not available for use by another client. The dirty flag 412 is used to avoid timing problems when an unused connection is selected to be closed so that a new connection can be established. Its use will be described in detail below.

Field 414 stores a hash value which, as previously mentioned, is determined by hashing either all or a portion of the connection information with a mathematical hashing algorithm. For example, the hash value may be generated by summing the integer values of all characters in the password. Field 416 is a "next" value which is used to link colliding entries together into a linked list. The next field contains the next entry in the linked list.

Figure 5:
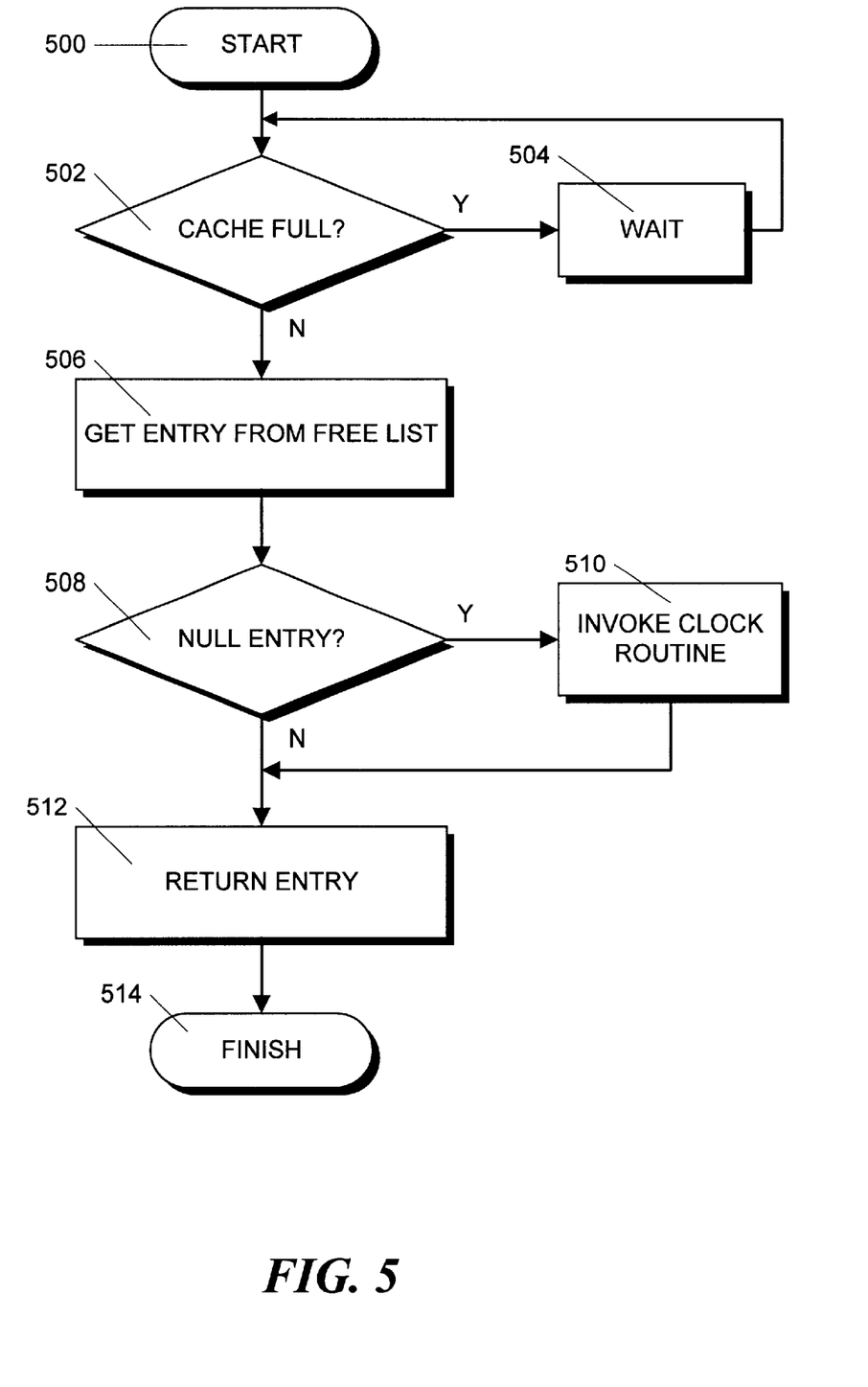
FIG. 5 is a flowchart illustrating a routine used to obtain a connection handle from the connection manager.

FIG. 5 is a flowchart which illustrates a routine which might be invoked by the server for obtaining a connection handle to a database connection when a new request arrives from a client. As shown in FIG. 5, the routine starts in step 500 and proceeds to step 502 where a determination is made whether the connection cache is full. This is determined by comparing the total number of entries in use (kept as an internal variable called numPinned) with the total number of cache entries. If all entries in use, the routine proceeds to step 504 where a wait state is entered. After a predetermined period of time, the routine proceeds back to step 502 where a check is made to determine whether the cache is still full. Operation proceeds in this manner until at least one connection becomes free.

When one connection becomes free, operation proceeds to step 506 where an attempt is made to obtain an entry from the free list using connection information contained in the request. This step is shown in more detail in FIGS. 6A and 6B. As will be discussed in detail hereinafter the routine in step 506 returns an entry containing a connection handle whose connection information matches the request connection information, if the connection is free. If no connections have connection information that matches the request connection information or the requested connection is not free, then a null entry is returned.

In step 508, the entry returned from the free list routine in step 506 is checked. If the entry is not null, the routine proceeds to step 512 to return the entry and ends in step 514.

Figure 7A:
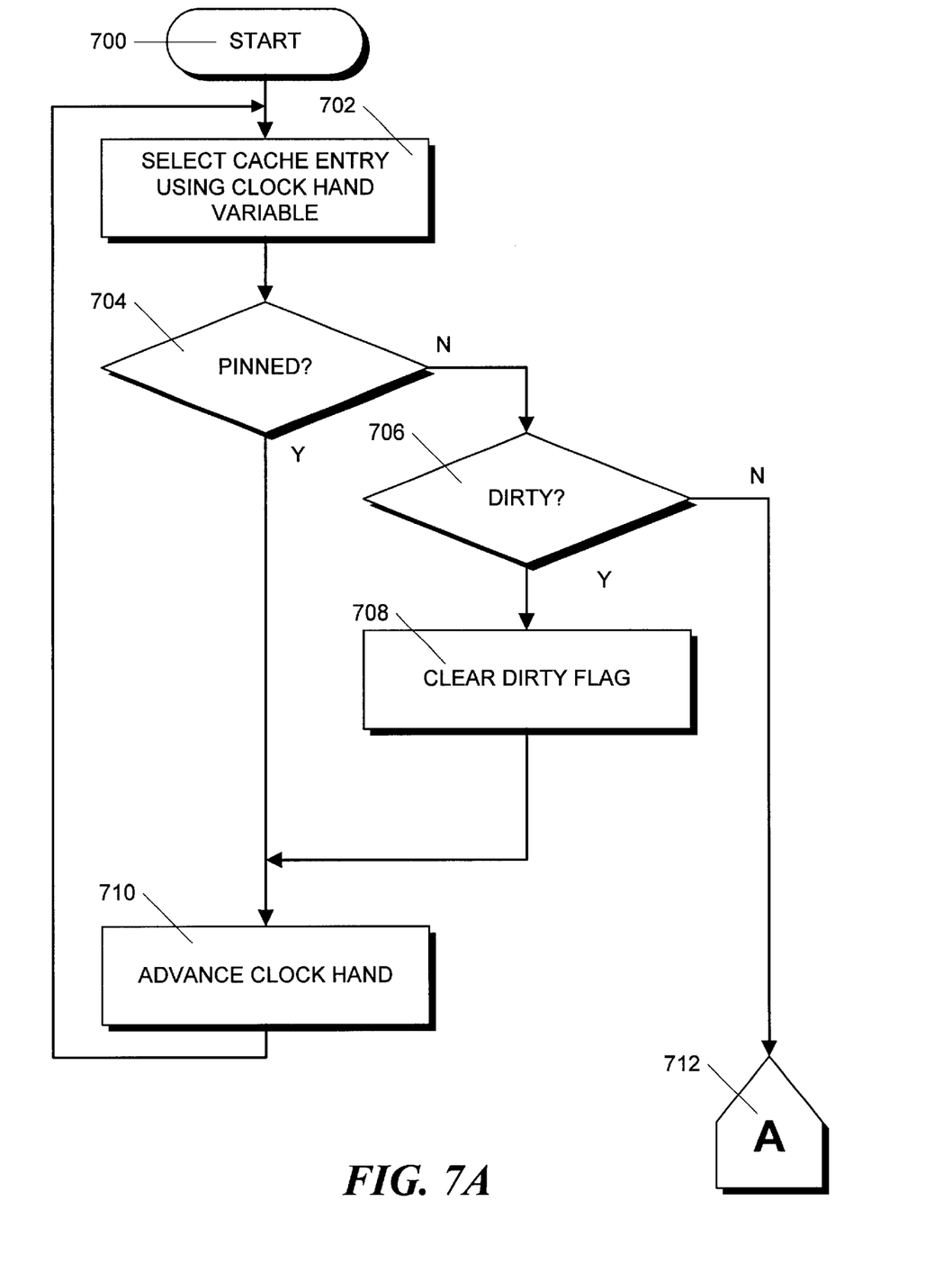
FIGS. 7A and 7B, when placed together, form a flowchart illustrating a routine which selectively closes an unused connection to make room for a new connection.
Figure 7B:
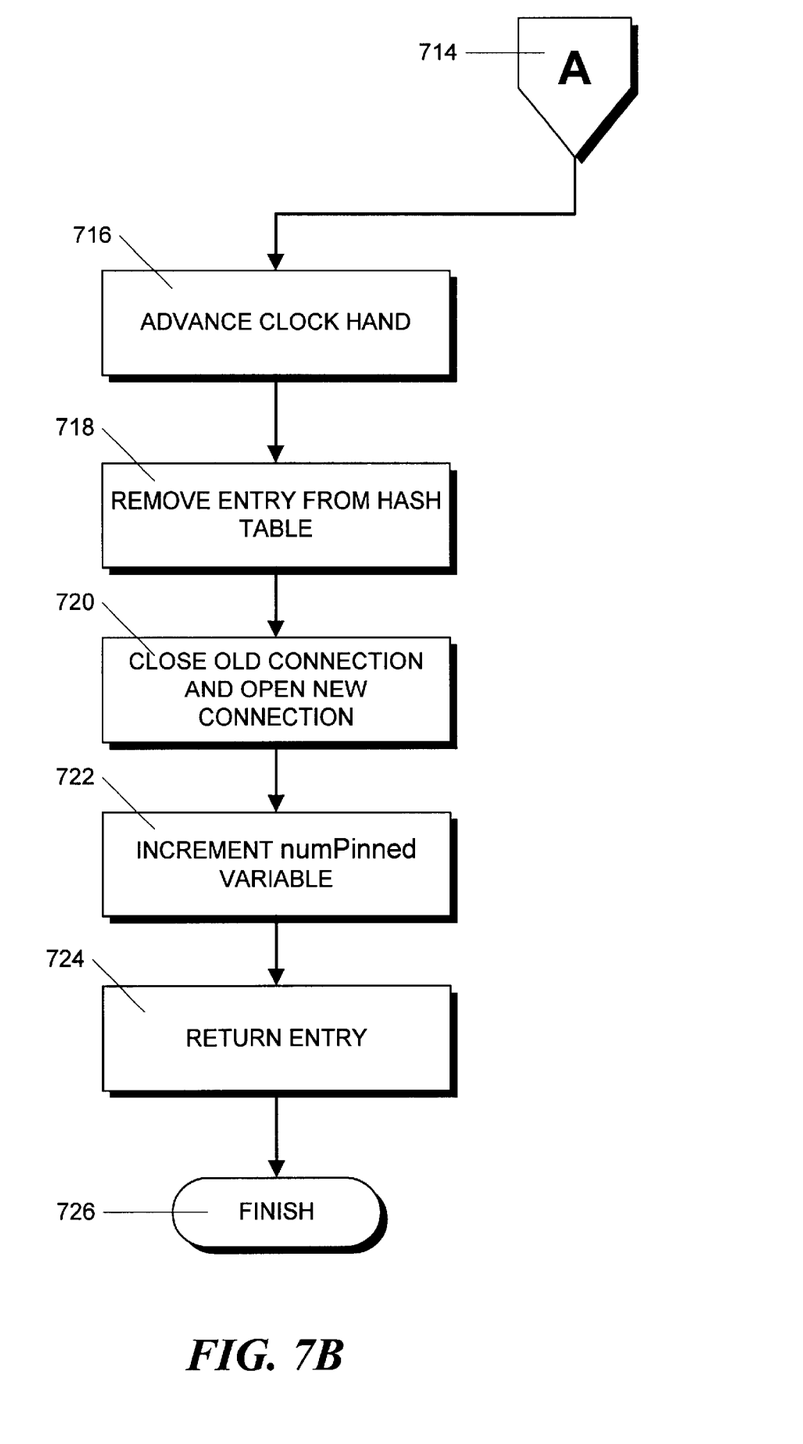

Alternatively, if in step 508, a null entry has been returned from the free list routine, then a "clock" routine is invoked in step 510. This routine is illustrated in more detail in FIG. 7. The routine sequentially examines each entry in the cache until it detects an entry which is not in use. That entry is then returned in step 512 and the routine ends in step 514.

Figure 6A:
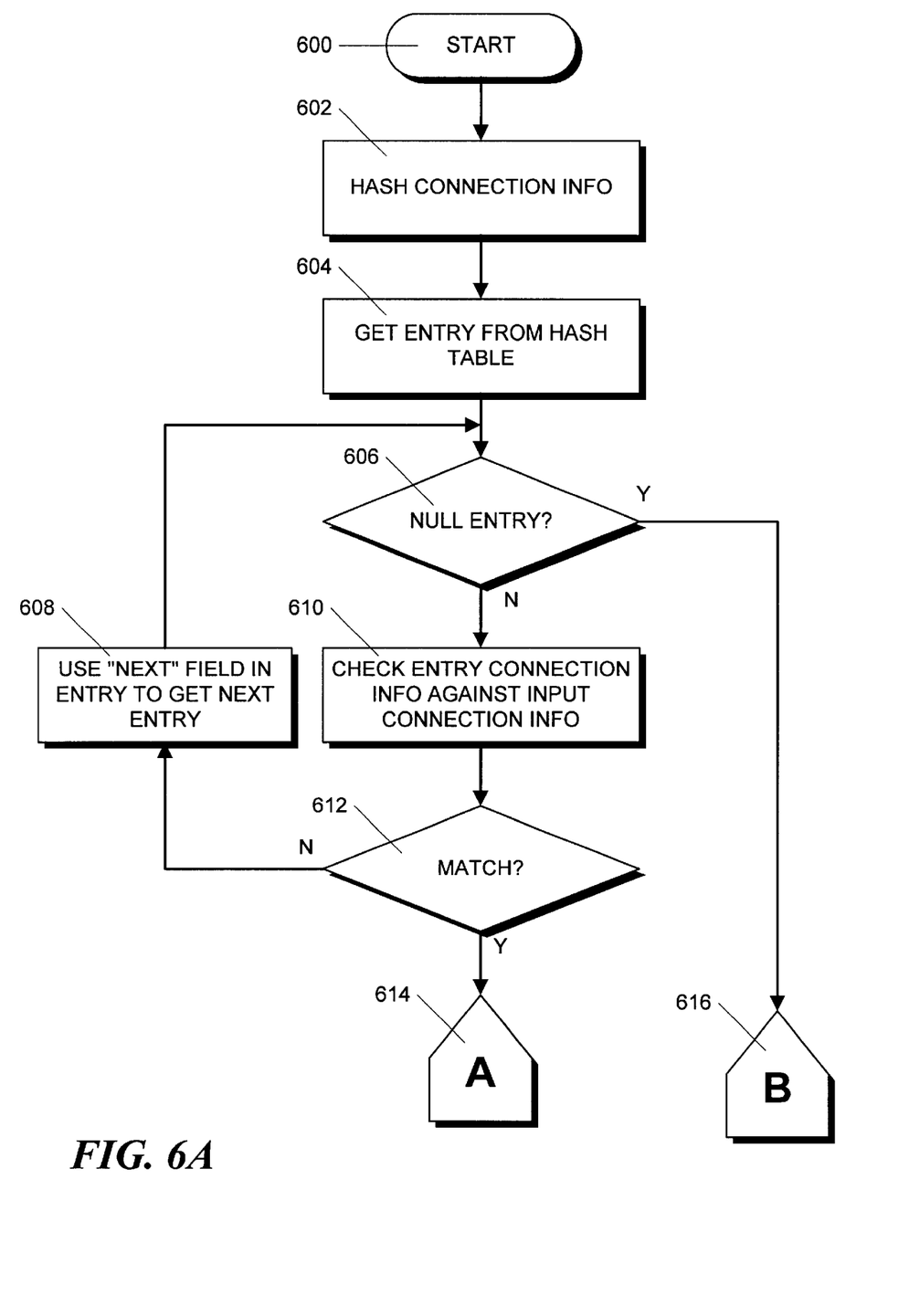
FIGS. 6A and 6B, when placed together, form a flowchart illustrating a routine which examines the free list to obtain a handle to an existing, unused connection.
Figure 6B:
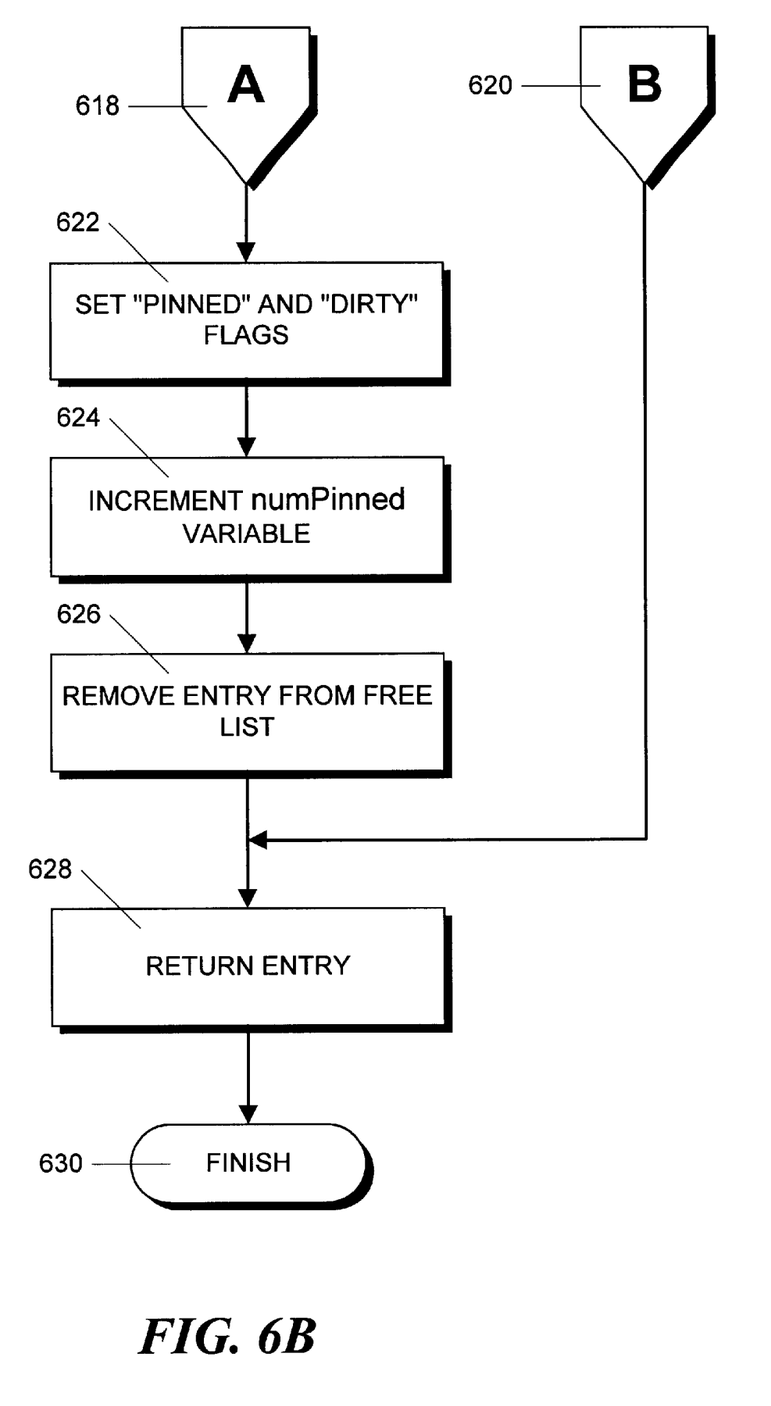

FIGS. 6A and 6B illustrate in detail the steps used to obtain an entry from the free list, which, as previously mentioned, is kept in a hash table. The routine starts in step 600 and proceeds to step 602 in which a hash value is calculated from the request connection information, as previously discussed. This hash value is then used, in step 604, to retrieve an entry from a hash table in which the free list is stored. A null entry returned from the hash table means that no free entries with the corresponding connection information are in the free list. In this case, the routine proceeds, via off-page connectors 616 and 620, to step 628 in which the null entry is returned. The routine then finishes in step 630.

Alternatively, if, in step 606, it is determined that the entry retrieved from the hash table is not null, then the routine proceeds to step 610 in which the entry connection information is compared to the request connection information. In step 612, a determination is made as to whether the entry connection information matches the input connection information. If it does not, the routine proceeds to step 608 in which the "next" field of the retrieved entry is used to get the next entry in the hash table linked list in case colliding entries have been stored in the same hash table location. The routine then proceeds back to step 606 where a check is made to determine whether the retrieved entry is null indicating that the end of the linked list has been retrieved.

Operation proceeds in this manner until a null entry is reached indicating that no free connections with the correct connection information exists, or a free connection with the correct connection information is detected in step 612.

If a free connection is detected in step 612, the routine proceeds, via off-page connectors 614 and 618, to step 622 in which the "pinned" and "dirty" flags of the detected entry are set. Next, in step 624, the numPinned variable is incremented and, in step 626, the selected entry is removed from the free list (if it subsequently become free.) Finally, in step 628, the entry is returned and the routine ends in step 630.

FIG. 7 illustrates in detail the steps involved in a "clock" routine. This routine starts in step 700 and proceeds to step 702 where one of the cache entries is selected using a "clock hand" variable. The "clock hand" variable sequentially points to each entry in the cache. When the end of the cache is reached, the clock variable is recycled to point to the beginning of the cache. In step 704, the check is made to determine whether the entry has been "pinned" or is in use. If the entry is in use, the routine proceeds to step 710 where the clock hand variable is advanced and the routine then proceeds back to step 702 where the next cache entry selected by the clock hand is examined.

Alternatively, if, in step 704, it is determined that the entry is no longer in use, the routine proceeds to step 706 where it is determined whether the "dirty" flag is set. The dirty flag is used to prevent re-use of the entry immediately after it is marked available to insure that timing constraints in the distributed object system are met. If it is determined in step 706 that the dirty flag is set, the dirty flag is cleared in step 708 and the routine proceeds to step 710 where the clock hand variable is advanced and the next entry is checked.

Alternatively, if, in step 706, it is determined that the dirty flag is not set, the routine proceeds, via off-page connectors 712 and 714, to step 716 where the clock hand is advanced to leave it in condition for the next invocation of the clock routine. Then, in step 718, the selected entry is removed from the free list in the hash table. In step 720, the selected connection is closed and a new connection is opened up with the new connection information. The connection information is then stored in the selected cache entry. Next, in step 722, the numPinned variable is incremented. In step 724, the new entry is returned and the routine finishes in step 726.

Figure 8:
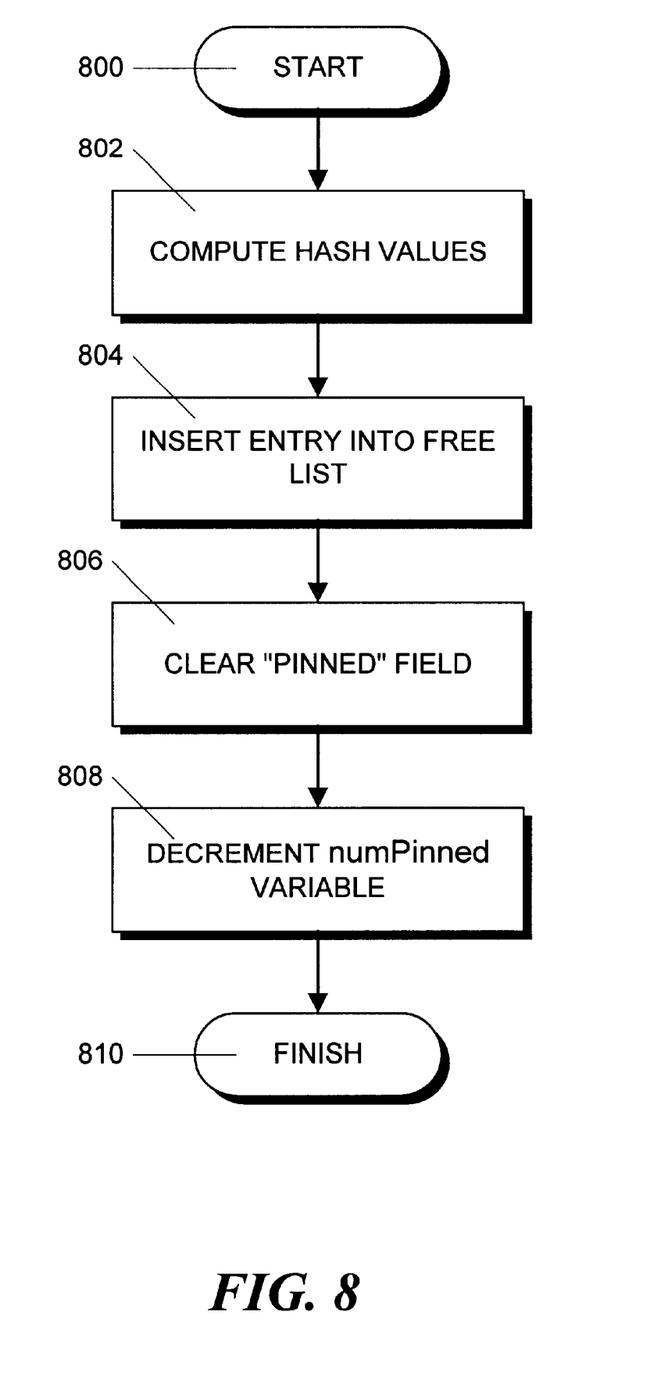
FIG. 8 is a flowchart illustrating a routine which releases a connection handle while maintaining the connection open.

FIG. 8 illustrates a routine which is used by the connection manager to release a connection handle when the client no longer is using the connection. In accordance with the principles of the present invention, even though the connection handle is released, the connection itself remains open so that reuse is possible. This routine starts in step 800 and proceeds to step 802 where the hash value is computed from the connection information, as previously described. The hash value is then used, in step 804, to insert the entry into the free list stored in the hash table. Next, in step 806, the pinned flag of the entry is cleared to indicate that the connection is no longer in use and in step 808, the numPinned variable is decremented to indicate that there is now a free connection. The routine then finishes in step 810.

Figure 9:
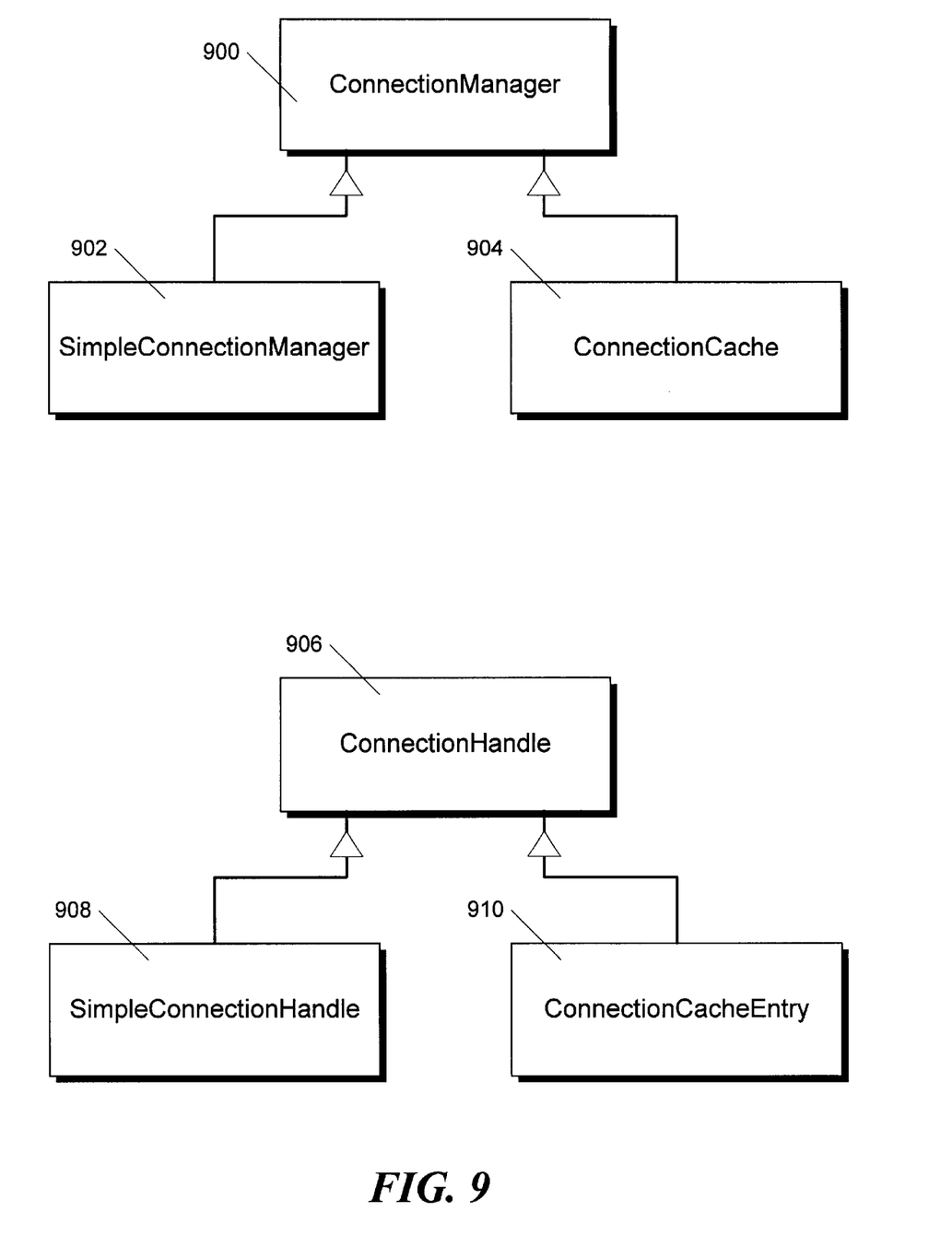
FIG. 9 is a class diagram illustrating the classes involved in implementing the connection manager in an object-oriented system.

In a preferred embodiment, the connection manager is implemented in an object-oriented programming language, such as Java. FIG. 9 indicates the classes which are used in such an implementation. In particular, a ConnectionManager class 900 has two subclasses, 902 and 904. The SimpleConnectionManager class 902 is used where no caching of connections is necessary. The ConnectionCache class 904 is used where, in accordance with the principles of the invention, a connection cache is desirable. Similarly, the connection handle information is represented by the ConnectionHandle class 906 which also has two subclasses, 908 and 910. The SimpleConnectionHandle class 908 is used where no caching is necessary, whereas the ConnectionCacheEntry subclass 910 is used in connection with the ConnectionCacheManager class 904.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A system for managing connections between a server and a plurality of databases in a distributed object network in response to a server request to open a first connection and to a server request to release a second connection, the system comprising:

a connection cache for storing information representing a plurality of connections;

opening apparatus cooperating with the connection cache which responds to the server open request by opening the first connection and storing information representing the first connection in the connection cache when the connection cache does not already contain information representing the first connection; and releasing apparatus which cooperates with the connection cache and responds to the server release request by marking the second connection as unused.

2. A system according to claim 1 wherein the opening apparatus responds to the server open request by re-using the first connection when the connection cache does contain information representing the first connection and the first connection is unused.

3. A system according to claim 2 wherein the opening apparatus marks the first connection as used when it re-uses the first connection.

4. A system according to claim 1 further comprising a clearing apparatus which responds to the server open request by selectively closing an open connection when the connection cache is full.

5. A system according to claim 4 wherein the clearing apparatus opens the first connection and stores information representing the first connection in the connection cache after selectively closing an open connection.

6. A system according to claim 1 further comprising a free list which stores information concerning all open and unused connections.

7. A system according to claim 6 wherein the opening apparatus responds to the server open request by checking the free list to determine whether the first connection is open and unused.

8. A system according to claim 6 wherein the releasing apparatus adds information representing the second connection to the free list.

9. A system according to claim 6 wherein the free list is implemented as a hash table.

10. A system according to claim 9 wherein the hash table is accessed by computing a hash value from connection information.

11. A method for managing connections between a server and a plurality of databases in a distributed object network in response to a server request to open a first connection and to a server request to release a second connection, the method comprising the steps of:

(a) storing information representing a plurality of connections;

(b) opening the first connection in response to the server open request and storing information representing the first connection in the connection cache when the connection cache does not already contain information representing the first connection; and (c) marking the second connection as unused in response to the server release request.

12. A method according to claim 11 wherein step (a) comprises the step of:

(a1) re-using the first connection when the connection cache does contains information representing the first connection and the first connection is unused.

13. A method according to claim 12 wherein step (a1) further comprises the step of:

(a1a) marking the first connection as used.

14. A method according to claim 11 further comprising the step of:

2. selectively closing an open connection in response to the server open request when the connection cache is full.

15. A method according to claim 14 wherein step (d) further comprises the step of:

(d1) opening the first connection and storing information representing the first connection in the connection cache.

16. A method according to claim 11 further comprising the step of:

(e) storing information concerning all open and unused connections in a free list.

17. A method according to claim 16 wherein step (e) comprises the step of:

(e1) checking the free list in response to the server open request to determine whether the first connection is open and unused.

18. A method according to claim 16 wherein step (e) further comprises the step of:

(e2) adding information representing the second connection to the free list in response to the server release request.

19. A method according to claim 16 wherein the free list is implemented as a hash table.

20. A method according to claim 19 wherein step (e) further comprises the step of:

(e3) accessing the hash table by computing a hash value from connection information.

21. A computer program product for managing connections between a server and a plurality of databases in a distributed object network in response to a server request to open a first connection and to a server request to release a second connection, the computer program product comprising a computer usable medium having computer readable program code thereon, including:

program code for storing information representing a plurality of connections;

program code for opening the first connection in response to the server open request and storing information representing the first connection in the connection cache when the connection cache does not already contain information representing the first connection; and program code for marking the second connection as unused in response to the server release request.

22. A computer program product according to claim 21 wherein the program code for storing information comprises program code for re-using the first connection when the connection cache does contains information representing the first connection and the first connection is unused.

23. A computer program product according to claim 22 wherein the program code for re-using the first connection comprises program code for marking the first connection as used.

24. A computer program product according to claim 21 further comprising program code for selectively closing an open connection in response to the server open request when the connection cache is full.

* * * * *